(12) United States Patent
Liang et al.

(10) Patent No.: US 10,523,849 B2
(45) Date of Patent: Dec. 31, 2019

(54) IMAGE SENSOR CIRCUIT AND IMAGE DEPTH SENSOR SYSTEM

(71) Applicant: SHENZHEN GOODIX TECHNOLOGY CO., LTD., Shenzhen (CN)

(72) Inventors: Yu An Liang, Taipei (TW); Mengta Yang, Taipei (TW)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 50 days.

(21) Appl. No.: 15/813,156

(22) Filed: Nov. 15, 2017

(65) Prior Publication Data

US 2019/0058812 A1 Feb. 21, 2019

Related U.S. Application Data

(63) Continuation of application No. PCT/CN2017/097980, filed on Aug. 18, 2017.

(51) Int. Cl.
| | |
|---|---|
| H04N 5/222 | (2006.01) |
| G06T 7/73 | (2017.01) |
| G06T 3/40 | (2006.01) |
| H04N 5/225 | (2006.01) |
| G01S 17/89 | (2006.01) |
| G01S 7/486 | (2006.01) |
| G01S 7/497 | (2006.01) |

(Continued)

(52) U.S. Cl.
CPC ......... *H04N 5/2226* (2013.01); *G06T 3/4023* (2013.01); *G06T 7/74* (2017.01); *H04N 5/225* (2013.01); *G06T 2207/10028* (2013.01)

(58) Field of Classification Search
CPC ........ H04N 5/2226; H04N 5/225; G06T 7/74; G06T 3/4023
See application file for complete search history.

(56) References Cited

U.S. PATENT DOCUMENTS 8,243,174 B2 * 8/2012 Ichikawa ............. H04N 5/3675
348/241
8,953,152 B2 2/2015 Min et al.
(Continued)

FOREIGN PATENT DOCUMENTS

| CN | 102694998 A | 9/2012 |
|---|---|---|
| CN | 104980605 A | 10/2015 |

(Continued)

*Primary Examiner* — Christopher K Peterson (57) ABSTRACT

The present disclosure provides an image sensor circuit, including: a photo pixel array, including a plurality of photo pixel series, where the photo pixel array output a plurality of pixel values; a reference pixel array, including at least one reference pixel series, where a reference pixel series in the at least one reference pixel series includes a plurality of reference pixel circuits, a first end of the reference pixel series receives a clock signal, and the reference pixel array outputs a plurality of phase differences between a plurality of received clock signals received by the plurality of reference pixel circuits and the clock signal; and an image depth determining unit, coupled to the photo pixel array and the reference pixel array, and configured to determine an image depth according to the plurality of pixel values and the plurality of phase differences.

8 Claims, 5 Drawing Sheets

(51) Int. Cl.
*H04N 5/357* (2011.01)
*H04N 5/376* (2011.01)
*H04N 5/369* (2011.01)
*G01S 17/42* (2006.01)
*H04N 5/365* (2011.01)

(56) References Cited

U.S. PATENT DOCUMENTS

| | | |
|---|---|---|
| 9,538,101 B2 | 1/2017 | Lee et al. |
| 2012/0242975 A1 | 9/2012 | Min et al. |
| 2014/0225173 A1* | 8/2014 | Kim ................ H01L 27/14612 |
| | | 257/292 |
| 2014/0375851 A1 | 12/2014 | Lee et al. |
| 2016/0198147 A1 | 7/2016 | Waligorski et al. |
| 2016/0353045 A1 | 12/2016 | Kawahito et al. |
| 2017/0026590 A1* | 1/2017 | Wang ................... H04N 5/2256 |
| 2018/0217261 A1* | 8/2018 | Wang ..................... G01S 17/89 |

FOREIGN PATENT DOCUMENTS

| | | |
|---|---|---|
| CN | 105894492 A | 8/2016 |
| CN | 106027881 A | 10/2016 |
| JP | 2008032877 A | 2/2008 |
| JP | 2010041460 A | 2/2010 |
| JP | 2014124493 A | 7/2014 |
| KR | 20110059253 A | 6/2011 |
| WO | 2016031066 A1 | 3/2016 |

* cited by examiner

IMAGE SENSOR CIRCUIT AND IMAGE DEPTH SENSOR SYSTEM

CROSS-REFERENCE TO RELATED APPLICATIONS

The present disclosure is a continuation of international application No. PCT/CN2017/097980, filed on Aug. 18, 2017, of which is hereby incorporated by reference in its entirety.

TECHNICAL FIELD

The present disclosure relates to an image sensor circuit and an image depth sensor system, and in particular, to an image sensor circuit and an image depth sensor system which may reduce an influence caused by phase differences of clock signals.

BACKGROUND

A 3D image sensor circuit may collect distance/depth information thereof with respect to a target object, and thus three dimensional image data is generated by a value of space or a value of distance between respective pixels of a 3D image, and the 3D image is also referred to as a distance image or a depth image. Additional distance dimension may be used in various applications to obtain more information about an object in a scene captured by a camera, thereby solving different tasks in the field of industrial sensors.

Generally, in a 3D image sensor circuit, incident light is emitted by a light emitting diode, a plurality of pixel circuits in a pixel array are used to collect reflected light corresponding to the incident light and reflected from a target object, and then a distance/depth between an electronic device (provided with the 3D image sensor circuit) and the target object may be calculated by comparing an optical path difference between the incident light and the reflected light. However, when the pixel array is large, a clock signal input to the pixel array may generate phase differences in the pixel array, causing that errors are generated when in the 3D image sensor circuit calculates the distance/depth between the electronic device and the target object.

Therefore, it is necessary to improve the prior art.

SUMMARY

Therefore, a main objective of the present disclosure is to provide an image sensor circuit and an image depth sensor system which may reduce an influence caused by phase differences of clock signals, so as to improve disadvantages of the prior art.

To solve the foregoing technical problem, the present disclosure provides an image sensor circuit, including: a photo pixel array, including a plurality of photo pixel series, where a photo pixel series in the plurality of photo pixel series includes a plurality of photo pixel circuits, a first end of the photo pixel series receives a clock signal, the clock signal is propagated from the first end of the photo pixel series to a second end of the photo pixel series, and the photo pixel array outputs a plurality of pixel values; a reference pixel array, including at least one reference pixel series, where a reference pixel series in the at least one reference pixel series includes a plurality of reference pixel circuits, a first end of the reference pixel series receives the clock signal, the clock signal is propagated from the first end of the reference pixel series to a second end of the reference pixel series, and the reference pixel array outputs a plurality of phase differences between a plurality of received clock signals received by the plurality of reference pixel circuits and the clock signal; and an image depth determining unit, coupled to the photo pixel array and the reference pixel array, and configured to determine an image depth according to the plurality of pixel values and the plurality of phase differences.

Preferably, the plurality of photo pixel series are parallel to each other, and the at least one reference pixel series is parallel to the plurality of photo pixel series.

Preferably, each photo pixel circuit of the photo pixel array includes a photo component, and each reference pixel circuit of the reference pixel array does not include a photo component.

Preferably, the reference pixel array does not receive external illumination.

Preferably, the reference pixel array is disposed adjacent to one side of the photo pixel array.

The present disclosure further provides an image depth sensor system, including: a light emitting unit, configured to emit incident light; and an image sensor circuit, including: a photo pixel array, including a plurality of photo pixel series, where a photo pixel series in the plurality of photo pixel series includes a plurality of photo pixel circuits, a first end of the photo pixel series receives a clock signal, the clock signal is propagated from the first end of the photo pixel series to a second end of the photo pixel series, and the photo pixel array outputs a plurality of pixel values; a reference pixel array, including at least one reference pixel series, where a reference pixel series in the at least one reference pixel series includes a plurality of reference pixel circuits, a first end of the reference pixel series receives the clock signal, the clock signal is propagated from the first end of the reference pixel series to a second end of the reference pixel series, and the reference pixel array outputs a plurality of phase differences between a plurality of received clock signals received by the plurality of reference pixel circuits and the clock signal; and an image depth determining unit, coupled to the photo pixel array and the reference pixel array, and configured to determine an image depth according to the plurality of pixel values and the plurality of phase differences.

According to the present disclosure, a reference pixel array that does not receive illumination is used to record phase delays/phase differences caused by conduction of a clock signal, and phase differences experienced by a photo pixel array are compensated when an image depth is calculated, so as to solve the disadvantage of an influence of phase differences of clock signals when an image depth is calculated in the prior art.

DESCRIPTION OF EMBODIMENTS

To make objectives, technical solutions and advantages of the present disclosure clearer, a further detailed description on the present invention will be given below in combination with accompanying drawings and embodiments. It should be understood that, specific embodiments described herein are merely used for illustrating the present disclosure, rather than limiting the present disclosure.

In the description and claims, the term "coupled" refers to any direct or indirect electrical connection means, and the term "electrically connected" refers to a direct electrical connection.

Figure 1:
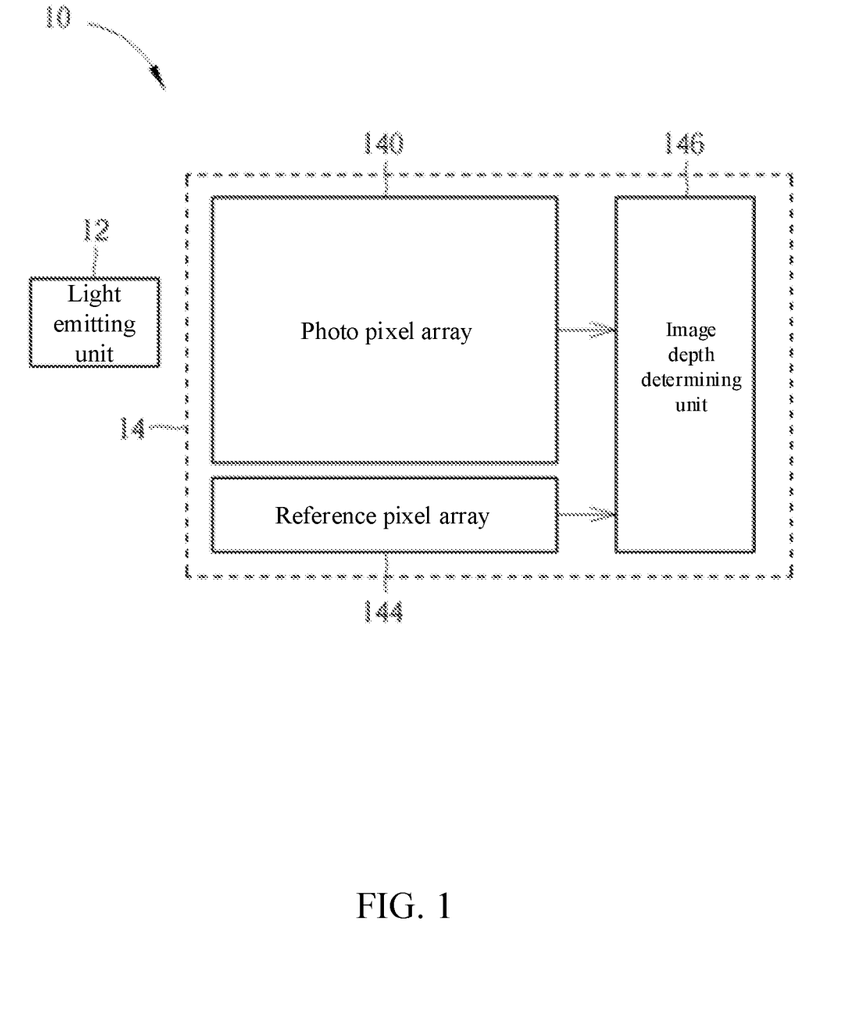
FIG. 1 is a schematic diagram of an image depth sensor system according to an embodiment of the present disclosure.

Referring to FIG. 1, FIG. 1 is a schematic diagram of an image depth sensor system 10 according to an embodiment of the present disclosure. The image depth sensor system 10 may be a three dimensional image sensor system, and may sense a distance/depth thereof with respect to a target object (not shown in FIG. 1) according to time of flight (ToF) of ray or light to create a three dimensional image of the target object. The image depth sensor system 10 includes a light emitting unit 12 and an image sensor circuit 14, and the light emitting unit 12 may be a light emitting diode (LED) with invisible light, such as an infrared light emitting diode. The light emitting unit 12 is configured to emit incident light, and the image sensor circuit 14 may receive reflected light corresponding to the incident light.

Figure 2:
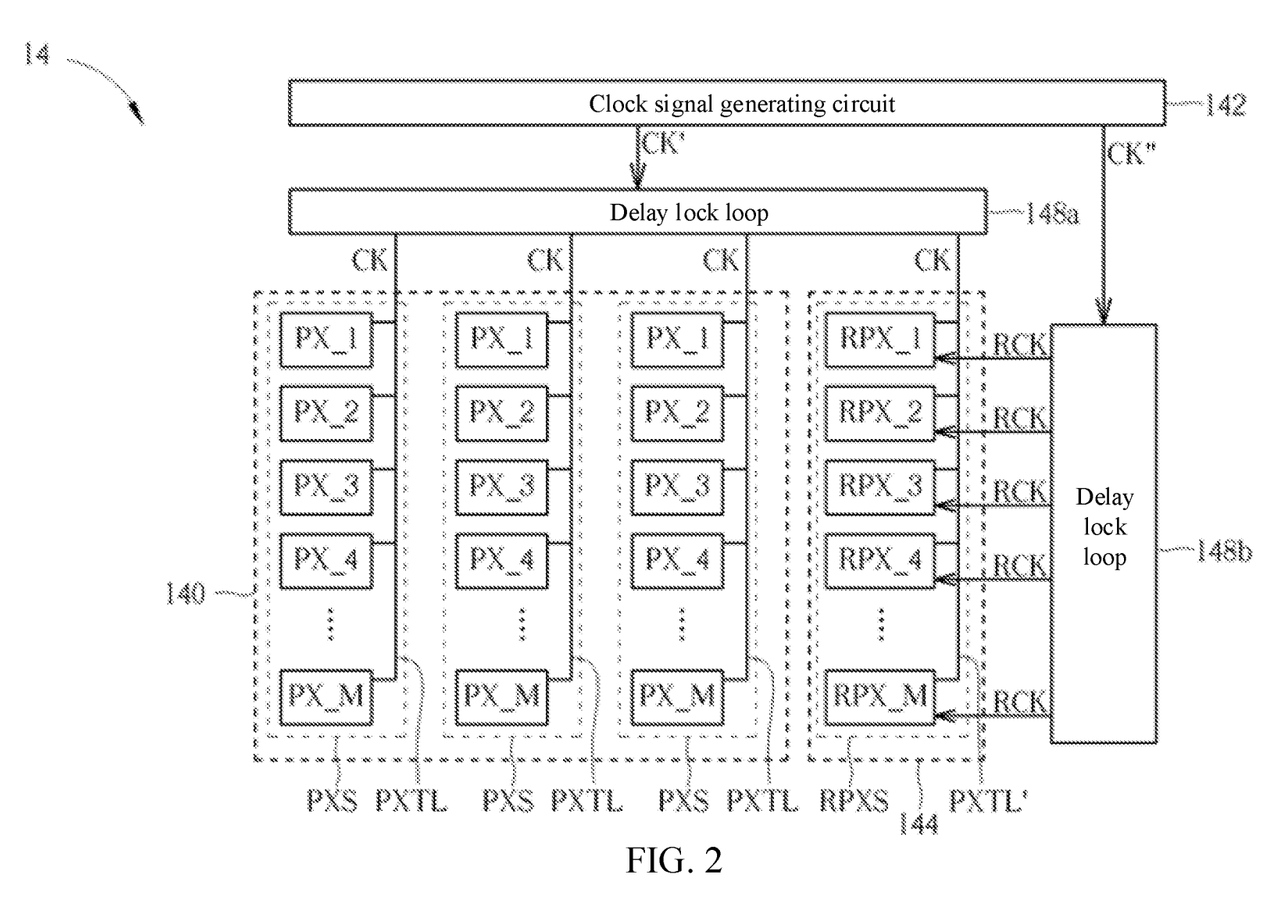
FIG. 2 is a schematic diagram of an image sensor circuit according to an embodiment of the present disclosure.

Specifically, referring to FIG. 1 and FIG. 2, FIG. 2 is a schematic diagram of an image sensor circuit 14 according to an embodiment of the present disclosure. The image sensor circuit 14 includes a photo pixel array 140, a clock signal generating circuit 142, a reference pixel array 144 and an image depth determining unit 146 (not shown in FIG. 2). The image sensor circuit 14 receives reflected light corresponding to the incident light using the photo pixel array 140, and the photo pixel array 140 outputs a plurality of pixel values. Furthermore, the reference pixel array 144 does not receive external illumination. In an embodiment, an opaque cover plate may be disposed above the reference pixel array 144 such that the reference pixel array 144 does not receive external illumination, and the reference pixel array 144 is configured to record a plurality of phase differences (which will be described hereinafter in detail). The image depth determining unit 146 is coupled to the photo pixel array 140 and the reference pixel array 144, and is configured to receive the plurality of pixel values output by the photo pixel array 140 and the plurality of phase differences output by the reference pixel array 144, and to determine an image depth according to the plurality of pixel values and the plurality of phase differences.

Specifically, the photo pixel array 140 includes a plurality of photo pixel series PXSs, a photo pixel series PXS may be a column or a row of photo pixels located in the photo pixel array 140, and the photo pixel series PXS includes a plurality of photo pixel circuits PX_1~PX_M, where each photo pixel circuit PX_m includes a photo component (where the photo component may be a photo diode or a photo transistor, and the photo component may be considered as a light-control current source. The plurality of photo pixel series PXSs are parallel to each other, where the photo pixel circuit PX_1 is a photo pixel circuit located at a first end (Terminal/End) of the photo pixel series PXS, the photo pixel circuit PX_M is a photo pixel circuit located at a second end of the photo pixel circuit PXS, and the photo pixel circuit PX_1 is the first photo pixel circuit in the photo pixel circuits PX_1~PX_M that receives a clock signal CK; in other words, the clock signal CK is propagated from the first end of the photo pixel series PXS/photo pixel circuit PX_1 to the second end of the photo pixel series PXS/photo pixel circuit PX_M.

Furthermore, the reference pixel array 144 is disposed adjacent to one side of the photo pixel array 140, and the reference pixel array 144 includes at least one reference pixel series RPXS, where the reference pixel series RPXS is parallel to the photo pixel series PXS, the reference pixel series RPXS includes a plurality of reference pixel circuits RPX_1~RPX_M, and each reference pixel circuit RPX_m may not include any photo component. Specifically, the reference pixel circuit RPX_m may have a similar circuit structure with the photo pixel circuit PX_m, and unlike the photo pixel circuit PX_m, the reference pixel circuit RPX_m does not possess the photo component in the photo pixel circuit PX_m, and a voltage-control current source is used to replace the photo component in the photo pixel circuit PX_m. Similarly, the reference pixel circuit RPX_1 is a reference pixel circuit located at a first end of the reference pixel series RPXS, the reference pixel circuit PX_M is a reference pixel circuit located at a second end of the reference pixel series RPXS, and the reference pixel circuit RPX_1 is the first photo pixel circuit in the reference pixel circuits RPX_1~RPX_M that receives the clock signal CK; in other words, the clock signal CK is propagated from the first end of the reference pixel series PXS/reference pixel circuit RPX_1 to the second end of the reference pixel series PXS/reference pixel circuit RPX_M.

Generally, the clock signal CK is conducted in clock signal transmission lines. In other words, the photo pixel series PXS may include clock signal transmission lines PXTLs, and the clock signal CK is propagated from the first end of the photo pixel series PXS/photo pixel circuit PX_1 to the second end of the photo pixel series PXS/photo pixel circuit PX_M through the clock signal transmission lines PXTLs. Similarly, the reference pixel series RPXS may include clock signal transmission lines PXTLs', and the clock signal CK is propagated from the first end of the reference pixel series PXS/reference pixel circuit RPX_1 to the second end of the reference pixel series PXS/reference pixel circuit RPX_M through the clock signal transmission lines PXTLs'.

Clock signals actually received by the photo pixel circuits PX_1~PX_M of the same photo pixel series PXS (received clock signals for short) have phase differences $\varphi_1$~$\varphi_M$ with respect to the clock signal CK without propagation delay since the clock signal CK conducted in the clock signal transmission lines PXTLs has propagation delay, and the phase differences $\varphi_1$~$\varphi_M$ may have an influence on calculation of a distance/depth, thereby increasing errors when the distance/depth is calculated.

Furthermore, received clock signals actually received by the reference pixel circuits RPX_1~RPX_M of the reference pixel series RPXS have phase differences $\varphi_1'$~$\varphi_M'$ with respect to the clock signal CK without propagation delay since the clock signal CK conducted in the clock signal transmission lines PXTLs' also has propagation delay. In an embodiment, the clock signal transmission lines PXTLs and the clock signal transmission lines PXTLs' may be the same transmission media and have the same signal conduction characteristics, and a transmission distance that the clock signal CK reaches the reference pixel circuits RPX_1~RPX_M is equal to a transmission distance that the clock signal CK reaches the photo pixel circuit PX_1~PX_M, so that the phase differences $\varphi_1'$~$\varphi_M'$ are the same as the phase differences $\varphi_1$~$\varphi_M$.

In this case, to reduce the influence of the phase differences $\varphi_1$~$\varphi_M$ on calculation of the distance/depth, the image sensor circuit 14 obtains the phase differences $\varphi_1'$~$\varphi_M'$ with the reference pixel array 144, and outputs information related to the phase difference $\varphi_1'\sim\varphi_M'$ to the image depth determining unit 146, and the image depth determining unit 146 may compensate the phase differences $\varphi_1'\sim\varphi_M'$ experienced by the photo pixel circuits PX_1~PX_M according to the phase difference $\varphi_1'\sim\varphi_M'$ when the image depth is calculated, such that the determination of the image depth is more accurate. In other words, the image depth determining unit 146 may determine the image depth according to the plurality of pixel values output by the photo pixel array 140 and the phase differences $\varphi_1'\sim\varphi_M'$ output by the reference pixel array 144, such that the determination of the image depth is more accurate.

Furthermore, as shown in FIG. 2, the photo pixel series PXS is coupled to the clock signal generating circuit 142 through a delay lock loop (DLL) 148a, and the delay lock loop 148a receives a clock signal CK' from the clock signal generating circuit 142, and generates the clock signal CK according to the clock signal CK'. It should be noted that the delay lock loop 148a may lock a delay of the clock signal, so that clock signals CKs that are input to each photo pixel series PXS in the photo pixel array 140 through the delay lock loop 148a have the same delays/phases. Furthermore, another delay lock loop 148b receives a clock signal CK" from the clock signal generating circuit 142, generates a reference clock signal RCK according to the clock signal CK", and inputs the reference clock signal RCK to the reference pixel circuits RPX_1~RPX_M. Similarly, the delay lock loop 148b may lock a delay of the clock signal, so that reference clock signals RCKs that are input to each reference pixel series RPXS_m through the delay lock loop 148b have the same delays/phases.

Figure 3:
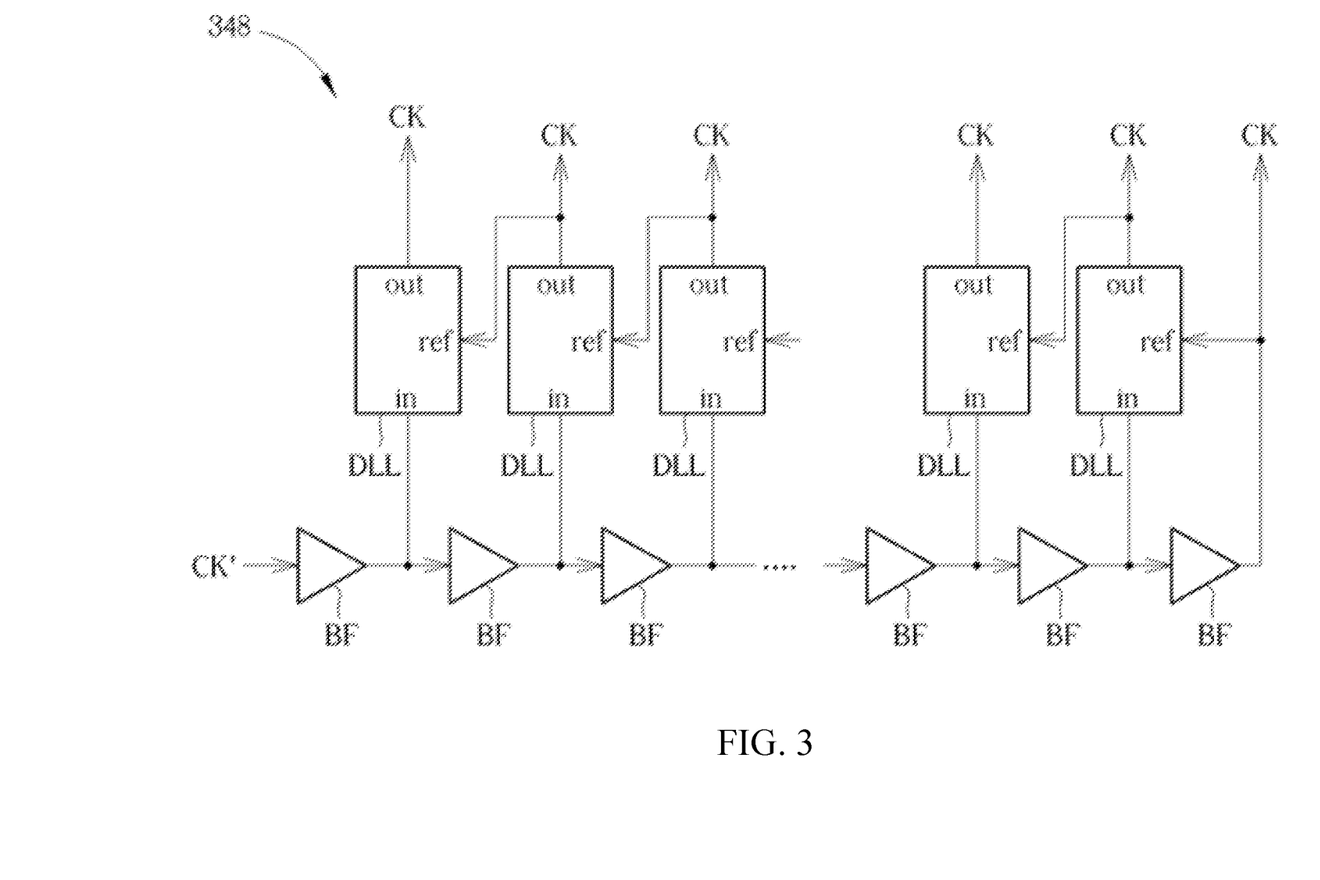
FIG. 3 is a schematic diagram of a delay lock loop according to an embodiment of the present disclosure.
Figure 4:
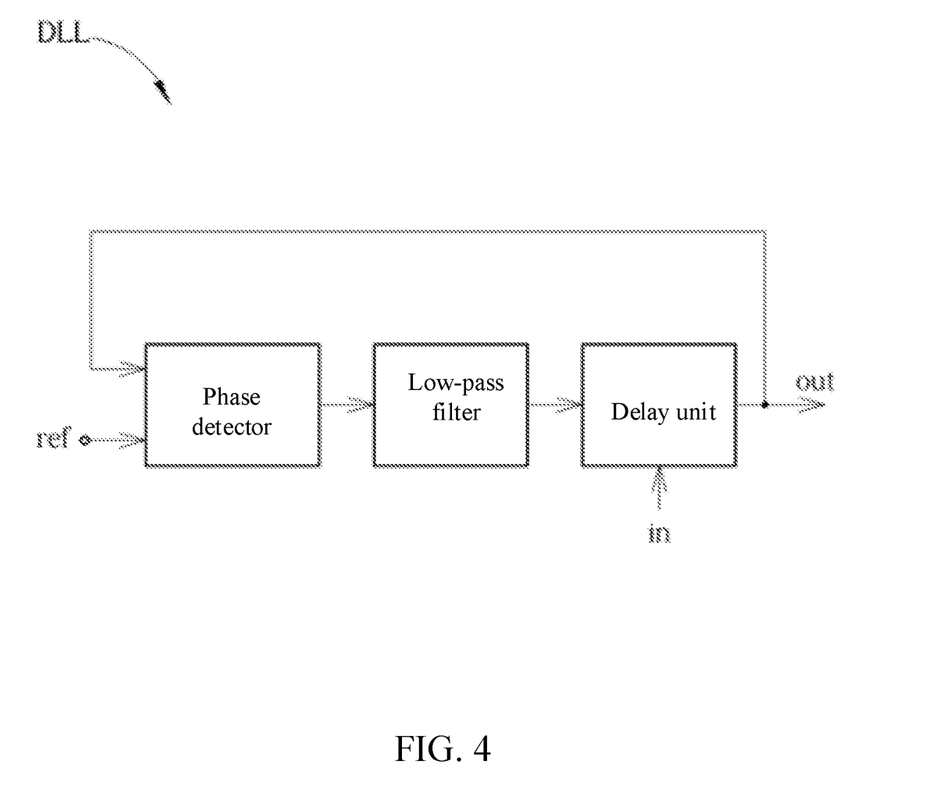
FIG. 4 is a schematic diagram of a delay lock unit according to an embodiment of the present disclosure.

The delay lock loop 148a and the delay lock loop 148b may have the same circuit structure, and the circuit structure thereof is well known to those skilled in the art, therefore, a brief description is provided as follows. Referring to FIG. 3 and FIG. 4, FIG. 3 is a schematic diagram of a delay lock loop 348 according to an embodiment of the present disclosure, and FIG. 4 is a schematic diagram of a delay lock unit DLL according to an embodiment of the present disclosure. The delay lock loop 348 may be used to implement the delay lock loop 148a. The delay lock loop 348 includes a plurality of buffers BFs and a plurality of delay lock units DLLs, where a delay lock unit DLL has input ends in, ref and an output end out, the delay lock unit DLL is configured to lock a delay/phase, so that a signal output by the output end (out) of the delay lock unit DLL and a signal input by the input end (ref) have the same delay/phase, and the detailed circuit structure may refer to FIG. 4. As such, the delay lock loop 348 may ensure that the clock signal CK output by each delay lock unit DLL has the same delay/phase. In addition, the delay lock loop 348 may also be used to implement the delay lock loop 148b, and the operation principles thereof may refer to the foregoing paragraphs, which will not be repeated redundantly here.

It can be seen from the foregoing description that an image sensor circuit 14 obtains phase differences $\varphi_1'\sim\varphi_M'$ with a reference pixel array 144, and phase differences $\varphi_1\sim\varphi_M$ experienced by photo pixel circuits PX_1~PX_M may be compensated by using the phase differences $\varphi_1'\sim\varphi_M'$ generated by the reference pixel array 144 when an image depth is calculated since the phase differences $\varphi_1'\sim\varphi_M'$ and the phase differences $\varphi_1\sim\varphi_M$ are the same, such that the determination of the image depth is more accurate.

Figure 5:
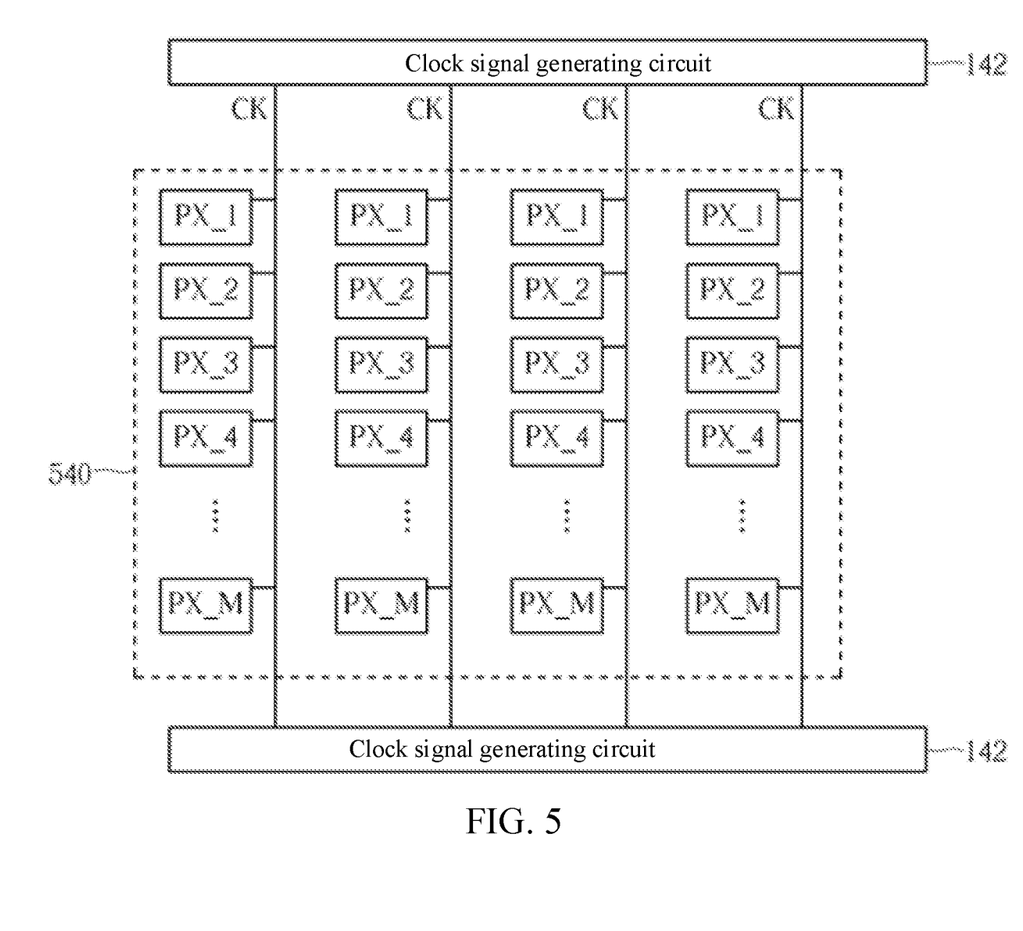
FIG. 5 is a schematic diagram of a pixel array.

By comparison, referring to FIG. 5, FIG. 5 is a schematic diagram of an existing pixel array 540. In the pixel array 540, received clock signals corresponding to pixel circuits PX_1~PX_M have phase differences $\varphi_1\sim\varphi_M$ with respect to a clock signal CK without propagation delay; however, in the prior art, compensation is not performed with respect to the phase differences $\varphi_1\sim\varphi_M$, such that the phase differences $\varphi_1\sim\varphi_M$ have an influence on calculation of a distance/depth, thereby increasing errors when the distance/depth is calculated.

To sum up, according to the present disclosure, a reference pixel array that does not receive illumination (or does not have a photo component) is used to record phase delays/phase differences caused by conduction of a clock signal, and phase differences experienced by a photo pixel array are compensated when an image depth is calculated, so that determination of the image depth is more accurate.

The foregoing descriptions are merely preferred embodiments of the present disclosure, rather than limiting the present disclosure, and any modifications, equivalent substitutions, improvements and the like, made within the spirit and principle of the present disclosure, are all encompassed in the protection scope of the present disclosure.

What is claimed is:

1. An image sensor circuit, wherein the image sensor circuit comprises:
   a photo pixel array, comprising a plurality of photo pixel series, wherein a photo pixel series in the plurality of photo pixel series comprises a plurality of photo pixel circuits, a photo pixel circuit at a first end of the photo pixel series is configured to receive a clock signal, which is propagated from the photo pixel circuit at the first end of the photo pixel series to a photo pixel circuit at a second end of the photo pixel series, and the photo pixel array is configured to output a plurality of pixel values, wherein the plurality of pixel values comprise a plurality of depth values, and the plurality of depth values are determined based on respective received clock signals received by the plurality of photo pixel circuits;
   a reference pixel array, comprising at least one reference pixel series, wherein the reference pixel series comprises a plurality of reference pixel circuits, a reference pixel circuit at a first end of the reference pixel series is configured to receive the clock signal, which is propagated from the reference pixel circuit at the first end of the reference pixel series to a reference pixel circuit at a second end of the reference pixel series, wherein the plurality of photo pixel series are parallel to each other, the reference pixel series is parallel to the plurality of photo pixel series, each reference pixel circuit of the reference pixel series corresponds to a photo pixel circuit of each photo pixel series, the each reference pixel circuit has a same propagation delay of the clock signal as the corresponding photo pixel circuit of the each photo pixel series, the reference pixel array is configured to output a plurality of phase differences between a plurality of received clock signals received by the plurality of reference pixel circuits and the clock signal, and the phase differences between the plurality of received clock signals received by the plurality of reference pixel circuits and the clock signal represent the propagation delay of the clock signal corresponding to the each reference pixel circuit; and
   a processor, coupled to the photo pixel array and the reference pixel array, and configured to determine an image depth according to the plurality of depth values and the plurality of phase differences.

2. The image sensor circuit according to claim 1, wherein each photo pixel circuit of the photo pixel array comprises a photo component, and each reference pixel circuit of the reference pixel array does not comprise a photo component.

3. The image sensor circuit according to claim 1, wherein the reference pixel array does not receive external illumination.

4. The image sensor circuit according to claim 1, wherein the reference pixel array is disposed adjacent to one side of the photo pixel array.

5. An image depth sensor system, comprising:
a light source, configured to emit incident light; and
an image sensor circuit, comprising:
a photo pixel array, comprising a plurality of photo pixel series, wherein a photo pixel series in the plurality of photo pixel series comprises a plurality of photo pixel circuits, a photo pixel circuit at a first end of the photo pixel series is configured to receive a clock signal, which is propagated from the photo pixel circuit at the first end of the photo pixel series to a photo pixel circuit at a second end of the photo pixel series, and the photo pixel array is configured to output a plurality of pixel values, wherein the plurality of pixel values comprise a plurality of depth values, and the plurality of depth values are determined based on respective received clock signals received by the plurality of photo pixel circuits;
a reference pixel array, comprising at least one reference pixel series, wherein the reference pixel series comprises a plurality of reference pixel circuits, a reference pixel circuit at a first end of the reference pixel series is configured to receive the clock signal, which is propagated from the reference pixel circuit at the first end of the reference pixel series to a reference pixel circuit at a second end of the reference pixel series, wherein the plurality of photo pixel series are parallel to each other, the reference pixel series is parallel to the plurality of photo pixel series, each reference pixel circuit of the reference pixel series corresponds to a photo pixel circuit of each photo pixel series, the each reference pixel circuit has a same propagation delay of the clock signal as the corresponding photo pixel circuit of the each photo pixel series, the reference pixel array is configured to output a plurality of phase differences between a plurality of received clock signals received by the plurality of reference pixel circuits and the clock signal, and the phase differences between the plurality of received clock signals received by the plurality of reference pixel circuits and the clock signal represent the propagation delay of the clock signal corresponding to the each reference pixel circuit; and
a processor, coupled to the photo pixel array and the reference pixel array, and configured to determine an image depth according to the plurality of depth values and the plurality of phase differences.

6. The image depth sensor system according to claim 5, wherein each photo pixel circuit of the photo pixel array comprises a photo component, and each reference pixel circuit of the reference pixel array does not comprise a photo component.

7. The image depth sensor system according to claim 5, wherein the reference pixel array does not receive external illumination.

8. The image depth sensor system according to claim 5, wherein the reference pixel array is disposed adjacent to one side of the photo pixel array.

* * * * *